United States Patent
Grubka

(10) Patent No.: US 11,313,127 B2
(45) Date of Patent: Apr. 26, 2022

(54) HIP AND RIDGE ROOFING MATERIAL

(71) Applicant: Owens Corning Intellectual Capital, LLC, Toledo, OH (US)

(72) Inventor: Lawrence J. Grubka, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 177 days.

(21) Appl. No.: 15/893,874

(22) Filed: Feb. 12, 2018

(65) Prior Publication Data

US 2018/0163405 A1 Jun. 14, 2018
US 2020/0354958 A9 Nov. 12, 2020

Related U.S. Application Data

(60) Division of application No. 14/870,400, filed on Sep. 30, 2015, now Pat. No. 9,890,534, which is a division
(Continued)

(51) Int. Cl.
*E04D 1/30* (2006.01)
*B32B 37/24* (2006.01)
(Continued)

(52) U.S. Cl.
CPC ............. *E04D 1/30* (2013.01); *B32B 37/24* (2013.01); *E04D 1/20* (2013.01);
(Continued)

(58) Field of Classification Search
CPC .... E04D 1/00; E04D 1/22; E04D 1/26; E04D 1/30; E04D 2001/005; E04D 2001/30;
(Continued)

(56) References Cited

U.S. PATENT DOCUMENTS

| 81,579 A | 9/1868 | Bailey |
| 154,334 A | 8/1874 | Marshall |

(Continued)

FOREIGN PATENT DOCUMENTS

| CA | 1207975 | 7/1986 |
| CA | 2697223 | 9/2010 |

(Continued)

OTHER PUBLICATIONS

Notice of Allowance from U.S. Appl. No. 15/397,850 dated Dec. 20, 2018.
(Continued)

*Primary Examiner* — Theodore V Adamos
(74) *Attorney, Agent, or Firm* — Calfee, Halter & Griswold LLP

(57) ABSTRACT

Shingle blanks including a first fold region, a second fold region, a third region, a lower edge and an upper edge are provided. The shingle blank has a length. The first and second fold regions extend substantially across the length of the shingle blank. The second fold region is positioned between the first and third fold regions. A first perforation line is positioned between the second and third fold regions. A second perforation line is positioned between the first and second fold regions. A reinforcement material is positioned over the first perforation line and configured to reinforce the first perforation line. The reinforcement material includes apertures configured to allow an asphalt coating to bleed through the reinforcement material. The first and second
(Continued)

perforation lines facilitate folding of the first and second fold regions on top of the third region to form a three layered stack.

20 Claims, 5 Drawing Sheets

Related U.S. Application Data of application No. 12/702,457, filed on Feb. 9, 2010, now Pat. No. 9,151,055, which is a continuation-in-part of application No. 12/392,392, filed on Feb. 25, 2009, now abandoned.

(51) Int. Cl.
*E04D 1/20* (2006.01)
*E04D 1/00* (2006.01)

(52) U.S. Cl.
CPC ..... *B32B 2037/243* (2013.01); *B32B 2395/00* (2013.01); *B32B 2419/06* (2013.01); *E04D 2001/005* (2013.01); *E04D 2001/305* (2013.01); *Y10T 156/1056* (2015.01)

(58) Field of Classification Search
CPC ........ E04D 2001/304; E04D 2001/305; E04D 1/20; Y10T 156/1056; B32B 37/24; B32B 2037/243; B32B 2395/00; B32B 2419/06
USPC ............. 52/518, 528, 532, 547, 98, 99, 198, 52/745.19, 540, 748.1; 454/365
See application file for complete search history.

(56) References Cited

U.S. PATENT DOCUMENTS

| | | |
|---|---|---|
| 356,161 A | 1/1887 | Ricketson |
| D48,172 S | 11/1915 | Dun Lany |
| 1,447,750 A | 3/1923 | Bird |
| 1,495,070 A | 5/1924 | Dozier |
| 1,516,243 A | 11/1924 | Perry |
| 1,583,563 A | 4/1925 | Herbert |
| 1,549,723 A | 8/1925 | Mattison |
| 1,585,693 A | 5/1926 | Robinson |
| 1,597,135 A | 8/1926 | Wittenberg |
| 1,601,731 A | 10/1926 | Flood |
| 1,665,222 A | 4/1928 | Robinson |
| 1,666,429 A | 4/1928 | Stolp, Jr. |
| 1,676,351 A | 7/1928 | Robinson |
| 1,698,891 A | 1/1929 | Overbury |
| 1,701,926 A | 2/1929 | Kirschbraun |
| 1,799,500 A | 4/1931 | Brophy |
| 1,802,868 A | 4/1931 | Black |
| 1,843,370 A | 2/1932 | Overbury |
| 1,860,899 A | 5/1932 | Miller |
| 1,885,346 A | 11/1932 | Harshberger |
| 1,897,139 A | 2/1933 | Overbury |
| 1,898,989 A | 2/1933 | Harshberger |
| 1,984,529 A | 12/1934 | Harshberger |
| 2,058,167 A | 10/1936 | Mcquade |
| 2,161,440 A | 6/1939 | Venrick |
| 2,490,430 A | 12/1949 | Greider et al. |
| 2,630,574 A | 3/1953 | Malarkey |
| 2,798,006 A | 7/1957 | Oldfield et al. |
| 2,847,948 A | 8/1958 | Truitt |
| 3,054,222 A | 9/1962 | Buckner |
| 3,127,701 A | 4/1964 | Jastrzemski |
| 3,138,897 A | 6/1964 | Mccorkle |
| 3,252,257 A | 5/1966 | Price et al. |
| 3,332,830 A | 7/1967 | Tomlinson et al. |
| 3,377,762 A | 4/1968 | Chalmers et al. |
| 3,468,086 A | 9/1969 | Warner |
| 3,468,092 A | 9/1969 | Chalmers |
| 3,624,975 A | 12/1971 | Morgan et al. |
| 3,664,081 A | 5/1972 | Martin et al. |
| 3,813,280 A | 5/1974 | Olszyk et al. |
| 3,913,294 A | 10/1975 | Freiborg |
| 4,091,135 A | 5/1978 | Tajima et al. |
| 4,194,335 A | 3/1980 | Diamond |
| 4,195,461 A | 4/1980 | Thiis-Evensen |
| 4,274,243 A | 6/1981 | Corbin et al. |
| 4,301,633 A | 11/1981 | Neumann |
| 4,307,552 A | 12/1981 | Votte |
| 4,333,279 A | 6/1982 | Corbin et al. |
| D265,510 S | 7/1982 | Bedwell |
| 4,352,837 A | 10/1982 | Kopenhaver |
| 4,366,197 A | 12/1982 | Hanlon et al. |
| 4,404,783 A * | 9/1983 | Freiborg ................. E04D 1/205 52/518 |
| 4,434,589 A | 3/1984 | Freiborg |
| 4,439,955 A | 4/1984 | Freiborg |
| 4,459,157 A | 7/1984 | Koons |
| 4,527,374 A | 7/1985 | Corbin |
| 4,580,389 A | 4/1986 | Freiborg |
| 4,637,191 A | 1/1987 | Smith |
| 4,672,790 A * | 6/1987 | Freiborg ................... E04D 1/26 52/521 |
| 4,680,909 A | 7/1987 | Stewart |
| 4,706,435 A | 11/1987 | Stewart |
| 4,717,614 A | 1/1988 | Bondoc et al. |
| 4,738,884 A | 4/1988 | Algrim et al. |
| 4,755,545 A | 7/1988 | Lalwani |
| 4,789,066 A | 12/1988 | Lisiecki |
| D300,257 S | 3/1989 | Stahl |
| 4,817,358 A | 4/1989 | Lincoln et al. |
| 4,824,880 A | 4/1989 | Algrim et al. |
| 4,835,929 A | 6/1989 | Bondoc et al. |
| 4,848,057 A | 7/1989 | MacDonald et al. |
| 4,856,251 A | 8/1989 | Buck |
| 4,869,942 A | 9/1989 | Jennus et al. |
| D309,027 S | 7/1990 | Noone et al. |
| D313,278 S | 12/1990 | Noone |
| 5,036,119 A | 7/1991 | Berggren |
| 5,039,755 A | 8/1991 | Chamberlain et al. |
| 5,065,553 A | 11/1991 | Magid |
| 5,082,704 A | 1/1992 | Higgins |
| 5,094,042 A | 3/1992 | Freborg |
| 5,181,361 A | 1/1993 | Hannah et al. |
| 5,195,290 A | 3/1993 | Hullett |
| 5,209,802 A | 5/1993 | Hannah et al. |
| 5,232,530 A | 8/1993 | Malmquist et al. |
| 5,239,802 A | 8/1993 | Robinson |
| 5,247,771 A | 9/1993 | Poplin |
| D340,294 S | 10/1993 | Hannah et al. |
| 5,271,201 A | 12/1993 | Noone et al. |
| 5,295,340 A | 3/1994 | Collins |
| D347,900 S | 6/1994 | Stapleton |
| 5,319,898 A | 6/1994 | Freiborg |
| 5,365,711 A | 11/1994 | Pressutti et al. |
| 5,369,929 A | 12/1994 | Weaver et al. |
| 5,375,387 A | 12/1994 | Davenport |
| 5,375,388 A | 12/1994 | Poplin |
| 5,400,558 A | 3/1995 | Hannah et al. |
| 5,419,941 A | 5/1995 | Noone et al. |
| 5,426,902 A | 6/1995 | Stahl et al. |
| 5,467,568 A * | 11/1995 | Sieling ...................... E04D 3/40 52/518 |
| 5,471,801 A | 12/1995 | Kupczyk et al. |
| D366,124 S | 1/1996 | Hannah et al. |
| 5,488,807 A | 2/1996 | Terrenzio et al. |
| D369,421 S | 4/1996 | Kiik et al. |
| D375,563 S | 11/1996 | Hannah et al. |
| 5,570,556 A * | 11/1996 | Wagner ..................... E04D 1/26 52/518 |
| 5,571,596 A | 11/1996 | Johnson |
| 5,575,876 A | 11/1996 | Noone et al. |
| 5,577,361 A | 11/1996 | Grabek, Jr. |
| D376,660 S | 12/1996 | Hannah et al. |
| 5,611,186 A | 3/1997 | Weaver |
| 5,615,523 A | 4/1997 | Wells et al. |
| 5,624,522 A | 4/1997 | Belt et al. |
| D379,672 S | 6/1997 | Lamb et al. |
| 5,651,734 A | 7/1997 | Morris |

(56) References Cited

U.S. PATENT DOCUMENTS

| | | | |
|---|---|---|---|
| 5,660,014 A | 8/1997 | Stahl et al. | |
| D383,223 S | 9/1997 | Sieling et al. | |
| 5,664,385 A | 9/1997 | Koschitzky | |
| 5,666,776 A | 9/1997 | Weaver et al. | |
| 5,676,597 A * | 10/1997 | Bettoli | E04D 1/30 454/365 |
| 5,711,126 A | 1/1998 | Wells | |
| 5,746,830 A | 5/1998 | Burton et al. | |
| 5,795,389 A | 8/1998 | Koschitzky | |
| 5,799,459 A | 9/1998 | Covert | |
| D400,268 S | 10/1998 | Sieling et al. | |
| 5,822,943 A * | 10/1998 | Frankoski | E04D 1/22 52/518 |
| D400,981 S | 11/1998 | Bondoc et al. | |
| D403,087 S | 12/1998 | Sieling et al. | |
| 5,853,858 A | 12/1998 | Bondoc | |
| 5,860,263 A | 1/1999 | Sieling et al. | |
| D406,361 S | 3/1999 | Bondoc et al. | |
| 5,901,517 A | 5/1999 | Stahl et al. | |
| 5,916,103 A | 6/1999 | Roberts | |
| 5,939,169 A | 8/1999 | Bondoc et al. | |
| 5,950,387 A * | 9/1999 | Stahl | E04D 1/26 52/559 |
| D417,016 S | 11/1999 | Moore et al. | |
| D417,513 S | 12/1999 | Blanpied | |
| 6,010,589 A | 1/2000 | Stahl et al. | |
| 6,014,847 A | 1/2000 | Phillips | |
| 6,021,611 A | 2/2000 | Wells et al. | |
| 6,038,826 A | 3/2000 | Stahl et al. | |
| 6,044,608 A | 4/2000 | Stahl et al. | |
| 6,070,384 A | 6/2000 | Chich | |
| 6,083,592 A | 7/2000 | Chich | |
| 6,105,329 A | 8/2000 | Bondoc et al. | |
| RE36,858 E | 9/2000 | Pressutti | |
| 6,112,492 A | 9/2000 | Wells et al. | |
| 6,125,602 A | 10/2000 | Freiborg et al. | |
| 6,145,265 A | 11/2000 | Malarkey et al. | |
| 6,148,578 A | 11/2000 | Nowacek et al. | |
| 6,156,289 A | 12/2000 | Chopra et al. | |
| 6,182,400 B1 | 2/2001 | Freiborg et al. | |
| 6,185,895 B1 | 2/2001 | Rettew | |
| 6,190,754 B1 | 2/2001 | Bondoc et al. | |
| 6,199,338 B1 | 3/2001 | Hudson et al. | |
| 6,220,329 B1 | 4/2001 | King et al. | |
| 6,247,289 B1 | 6/2001 | Karpinia | |
| 6,253,512 B1 | 7/2001 | Thompson et al. | |
| 6,310,122 B1 | 10/2001 | Butler et al. | |
| 6,343,447 B2 | 2/2002 | Geissels et al. | |
| 6,351,913 B1 | 3/2002 | Freiborg et al. | |
| 6,355,132 B1 | 3/2002 | Becker et al. | |
| 6,361,851 B1 | 3/2002 | Sieling et al. | |
| 6,397,546 B1 | 6/2002 | Malarkey et al. | |
| 6,397,556 B1 | 6/2002 | Karpinia | |
| 6,401,425 B1 | 6/2002 | Frame | |
| 6,426,309 B1 | 7/2002 | Miller et al. | |
| 6,467,235 B2 | 10/2002 | Kalkanoglu et al. | |
| 6,471,812 B1 | 10/2002 | Thompson et al. | |
| D466,629 S | 12/2002 | Phillips | |
| 6,487,828 B1 | 12/2002 | Phillips | |
| 6,494,010 B1 | 12/2002 | Brandon et al. | |
| 6,510,664 B2 * | 1/2003 | Kupczyk | E04D 1/26 52/528 |
| 6,523,316 B2 | 2/2003 | Stahl et al. | |
| 6,530,189 B2 | 3/2003 | Freshwater et al. | |
| D473,326 S | 4/2003 | Phillips | |
| 6,565,431 B1 | 5/2003 | Villela | |
| 6,578,336 B2 | 6/2003 | Elliott | |
| 6,610,147 B2 | 8/2003 | Aschenbeck | |
| 6,652,909 B2 | 11/2003 | Lassiter | |
| 6,679,020 B2 | 1/2004 | Becker et al. | |
| 6,679,308 B2 | 1/2004 | Becker et al. | |
| 6,691,489 B2 | 2/2004 | Frame | |
| 6,703,120 B1 | 3/2004 | Ko et al. | |
| 6,708,456 B2 | 3/2004 | Kiik et al. | |
| 6,709,760 B2 | 3/2004 | Trumbore et al. | |
| 6,709,994 B2 | 3/2004 | Miller et al. | |
| 6,725,609 B2 | 4/2004 | Freiborg et al. | |
| 6,758,019 B2 | 7/2004 | Kalkanoglu et al. | |
| 6,759,454 B2 | 7/2004 | Stephens et al. | |
| 6,790,307 B2 | 9/2004 | Elliott | |
| 6,804,919 B2 | 10/2004 | Railkar | |
| 6,813,866 B2 | 11/2004 | Naipawer | |
| 6,823,637 B2 | 11/2004 | Elliott et al. | |
| 6,895,724 B2 | 5/2005 | Naipawer, III | |
| 6,933,037 B2 | 8/2005 | McCumber et al. | |
| 6,936,329 B2 | 8/2005 | Kiik et al. | |
| 6,990,779 B2 | 1/2006 | Kiik et al. | |
| 7,021,468 B2 | 4/2006 | Cargile, Jr. | |
| 7,029,739 B2 | 4/2006 | Weinstein et al. | |
| 7,048,990 B2 | 5/2006 | Koschitzky | |
| 7,070,051 B2 | 7/2006 | Kanner et al. | |
| 7,073,295 B2 | 7/2006 | Pressutti et al. | |
| 7,082,724 B2 | 8/2006 | Railkar et al. | |
| 7,118,794 B2 | 10/2006 | Kalkanoglu et al. | |
| 7,121,055 B2 | 10/2006 | Penner | |
| 7,124,548 B2 | 10/2006 | Pressutti et al. | |
| 7,146,771 B2 | 12/2006 | Swann | |
| 7,165,363 B2 | 1/2007 | Headrick, II et al. | |
| 7,238,408 B2 | 7/2007 | Aschenbeck et al. | |
| 7,267,862 B1 | 9/2007 | Burke et al. | |
| 7,282,536 B2 | 10/2007 | Handlin, Jr. et al. | |
| 7,556,849 B2 | 7/2009 | Thompson et al. | |
| D610,720 S | 2/2010 | Elliot | |
| 7,765,763 B2 | 8/2010 | Teng et al. | |
| 7,781,046 B2 | 8/2010 | Kalkanoglu et al. | |
| 7,805,905 B2 | 10/2010 | Rodrigues et al. | |
| 7,820,237 B2 | 10/2010 | Harrington, Jr. | |
| 7,836,654 B2 | 11/2010 | Belt et al. | |
| D633,221 S | 2/2011 | Koch | |
| D633,222 S | 2/2011 | Koch | |
| 7,877,949 B1 | 2/2011 | Elliott | |
| 7,909,235 B2 | 3/2011 | Holley, Jr. | |
| 7,921,606 B2 | 4/2011 | Quaranta et al. | |
| 8,006,457 B2 | 8/2011 | Binkley et al. | |
| 8,127,514 B2 | 3/2012 | Binkley et al. | |
| 8,181,413 B2 | 5/2012 | Belt et al. | |
| 8,216,407 B2 | 7/2012 | Kalkanoglu et al. | |
| 8,240,102 B2 | 8/2012 | Belt et al. | |
| 8,266,861 B2 | 9/2012 | Koch et al. | |
| 8,281,520 B2 | 10/2012 | Quaranta et al. | |
| 8,281,539 B2 | 10/2012 | Kalkanoglu | |
| 8,302,358 B2 | 11/2012 | Kalkanoglu | |
| 8,316,608 B2 | 11/2012 | Binkley et al. | |
| 8,323,440 B2 | 12/2012 | Koch et al. | |
| 8,371,072 B1 | 2/2013 | Shanes et al. | |
| 8,371,085 B2 | 2/2013 | Koch | |
| 8,453,408 B2 | 6/2013 | Kalkanoglu et al. | |
| D695,925 S | 12/2013 | Ray | |
| D711,558 S | 8/2014 | Bobolts | |
| D735,545 S | 8/2015 | Rampling | |
| 9,574,350 B2 | 2/2017 | Loftus et al. | |
| 9,890,534 B2 | 2/2018 | Grubka | |
| 2001/0000372 A1 | 4/2001 | Kalkanoglu et al. | |
| 2001/0049002 A1 | 12/2001 | Mccumber et al. | |
| 2002/0000068 A1 | 1/2002 | Freiborg et al. | |
| 2002/0038531 A1 | 4/2002 | Freshwater et al. | |
| 2002/0078651 A1 | 6/2002 | Freshwater et al. | |
| 2002/0114913 A1 | 8/2002 | Weinstein et al. | |
| 2002/0189189 A1 * | 12/2002 | Kupczyk | E04D 1/26 52/557 |
| 2003/0040241 A1 | 2/2003 | Kiik et al. | |
| 2003/0070579 A1 | 4/2003 | Hong et al. | |
| 2003/0093958 A1 | 5/2003 | Freiborg et al. | |
| 2003/0093963 A1 | 5/2003 | Stahl et al. | |
| 2003/0124292 A1 | 7/2003 | Unterreiter | |
| 2003/0138601 A1 | 7/2003 | Elliott | |
| 2003/0196389 A1 * | 10/2003 | Naipawer, III | E04D 1/30 52/57 |
| 2004/0055240 A1 | 3/2004 | Kiik et al. | |
| 2004/0055241 A1 | 3/2004 | Railkar | |
| 2004/0079042 A1 | 4/2004 | Elliott | |
| 2004/0083672 A1 * | 5/2004 | Penner | E04D 1/30 52/518 |
| 2004/0083673 A1 | 5/2004 | Kalkanoglu et al. | |

(56) References Cited

U.S. PATENT DOCUMENTS

| | | |
|---|---|---|
| 2004/0083674 A1 | 5/2004 | Kalkanoglu et al. |
| 2004/0109971 A1 | 6/2004 | Weinstein et al. |
| 2004/0111996 A1 | 6/2004 | Heroneme |
| 2004/0123537 A1 | 7/2004 | Elliott et al. |
| 2004/0123543 A1 | 7/2004 | Elliott et al. |
| 2004/0123545 A1* | 7/2004 | Phillips .............. E04D 1/26 52/535 |
| 2004/0148874 A1 | 8/2004 | Jolitz et al. |
| 2004/0172908 A1 | 9/2004 | Swann |
| 2004/0206012 A1 | 10/2004 | Pressutti et al. |
| 2004/0206035 A1 | 10/2004 | Kandalgaonkar |
| 2004/0258883 A1 | 12/2004 | Weaver |
| 2005/0005555 A1 | 1/2005 | Naipawer |
| 2005/0137295 A1 | 6/2005 | Kendrick et al. |
| 2005/0193673 A1 | 9/2005 | Rodrigues et al. |
| 2005/0204675 A1 | 9/2005 | Snyder et al. |
| 2005/0210808 A1 | 9/2005 | Larson et al. |
| 2005/0235599 A1 | 10/2005 | Kalkanoglu et al. |
| 2005/0252136 A1 | 11/2005 | Hardin |
| 2006/0032174 A1 | 2/2006 | Floyd |
| 2006/0175386 A1 | 8/2006 | Holley |
| 2006/0179767 A1 | 8/2006 | Miller et al. |
| 2006/0201094 A1 | 9/2006 | Lassiter |
| 2006/0265990 A1 | 11/2006 | Kalkanoglu et al. |
| 2007/0020436 A1 | 1/2007 | Teng et al. |
| 2007/0039274 A1 | 2/2007 | Harrington et al. |
| 2007/0042158 A1* | 2/2007 | Belt .............. B32B 3/10 428/143 |
| 2007/0107372 A1 | 5/2007 | Harrington |
| 2007/0144077 A1 | 6/2007 | Quaranta et al. |
| 2007/0179220 A1 | 8/2007 | Sasagawa et al. |
| 2007/0266665 A1 | 11/2007 | Todd et al. |
| 2008/0086970 A1* | 4/2008 | Teng .............. E04D 1/26 52/518 |
| 2008/0134612 A1* | 6/2008 | Koschitzky .............. E04D 1/26 52/553 |
| 2008/0271773 A1* | 11/2008 | Jacobs .............. H01L 31/02366 136/244 |
| 2009/0038257 A1 | 2/2009 | Todd et al. |
| 2009/0139175 A1 | 6/2009 | Todd et al. |
| 2009/0282767 A1 | 11/2009 | Grubka |
| 2010/0077689 A1 | 4/2010 | Kalkanoglu et al. |
| 2010/0143667 A1 | 6/2010 | Collins et al. |
| 2010/0146878 A1* | 6/2010 | Koch .............. H02S 40/36 52/173.3 |
| 2010/0192496 A1 | 8/2010 | Koch et al. |
| 2010/0192500 A1 | 8/2010 | Koch |
| 2010/0192501 A1 | 8/2010 | Koch et al. |
| 2010/0212240 A1 | 8/2010 | Grubka |
| 2010/0212246 A1* | 8/2010 | Grubka .............. B32B 37/24 52/540 |
| 2010/0218433 A1 | 9/2010 | Quaranta et al. |
| 2010/0236178 A1 | 9/2010 | Loftus et al. |
| 2010/0239807 A1 | 9/2010 | Grubka et al. |
| 2010/0275527 A1* | 11/2010 | Karol .............. E04D 1/22 52/105 |
| 2010/0310825 A1 | 12/2010 | Kalkanoglu et al. |
| 2010/0313512 A1 | 12/2010 | Rodrigues et al. |
| 2011/0005158 A1 | 1/2011 | Kailey et al. |
| 2011/0126485 A1 | 6/2011 | Bleil et al. |
| 2011/0151170 A1 | 6/2011 | Grubka et al. |
| 2011/0209428 A1 | 9/2011 | Elliott |
| 2011/0214378 A1 | 9/2011 | Grubka et al. |
| 2011/0319533 A1 | 12/2011 | Gauthier et al. |
| 2013/0177728 A1 | 7/2013 | Grubka et al. |
| 2016/0017608 A1 | 1/2016 | Grubka |
| 2016/0024792 A1 | 1/2016 | Grubka et al. |
| 2017/0145271 A1 | 5/2017 | Loftus et al. |

FOREIGN PATENT DOCUMENTS

| | | |
|---|---|---|
| JP | 50002937 | 1/1975 |
| WO | 05/100479 | 10/2005 |
| WO | 07/108846 | 9/2007 |
| WO | 08/052029 | 5/2008 |
| WO | 09/016281 | 2/2009 |
| WO | 10/098972 | 9/2010 |
| WO | 11/100217 | 8/2011 |

OTHER PUBLICATIONS

Office Action from U.S. Appl. No. 15/700,455 dated Sep. 26, 2019.
Office action from Canadian Application No. 2,799,834 dated Aug. 14, 2018.
Office action from U.S. Appl. No. 15/397,850 dated Mar. 24, 2017.
Office action from U.S. Appl. No. 15/397,850 dated Jul. 27, 2017.
Notice of Allowance from U.S. Appl. No. 15/397,850 dated Mar. 22, 2018.
Office action from U.S. Appl. No. 29/483,307 dated Sep. 15, 2015.
Notice of Allowance from U.S. Appl. No. 14/751,334 dated Apr. 8, 2016.
Notice of Allowance from U.S. Appl. No. 29/483,307 dated Feb. 11, 2016.
Office action from Canadian Application No. 2,697,221 dated Feb. 2, 2016.
Office action from Canadian Application No. 2,753,250 dated Nov. 26, 2015.
Office action from Canadian Application No. 2,697,223 dated Jan. 12, 2016.
Office action from Canadian Application No. 2,697,223 dated Aug. 25, 2016.
Office action from Canadian Application No. 2,729,373 dated Dec. 20, 2016.
Office action from Canadian Application No. 2,729,373 dated Aug. 30, 2017.
Office action from Canadian Application No. 2,753,250 dated Aug. 19, 2016.
Office action from Canadian Application No. 2,788,522 dated Jan. 11, 2017.
Advisory action from U.S. Appl. No. 09/515,928 dated Feb. 22, 2005.
Advisory action from U.S. Appl. No. 09/515,928 dated Jun. 7, 2002.
Advisory action from U.S. Appl. No. 09/515,928 dated Jul. 19, 2007.
Advisory action from U.S. Appl. No. 12/119,937 dated Jan. 19, 2011.
Advisory Action from U.S. Appl. No. 12/392,392 dated Feb. 27, 2012.
Advisory Action from U.S. Appl. No. 12/392,392 dated Dec. 14, 2010.
Advisory Action from U.S. Appl. No. 12/702,457 dated Aug. 27, 2014.
Advisory action from U.S. Appl. No. 12/727,459 dated Dec. 13, 2012.
Advisory action from U.S. Appl. No. 13/039,726 dated Oct. 28, 2014.
Decision on Appeal from U.S. Appl. No. 09/515,928 dated Jul. 28, 2010.
Examiner's Answer from U.S. Appl. No. 09/515,928 dated Jun. 18, 2008.
Haynes, Shellflex 3681 MSDS, Jan. 4, 1999, 5 pgs.
International Search Report and Written Opinion from PCT/US07/07827 dated Aug. 29, 2007.
International Search Report and Written Opinion from PCT/US10/23541 dated Jul. 6, 2010.
International Search Report and Written Opinion from PCT/US11/023989 dated May 26, 2011.
International Search Report from PCT/US06/30633 dated Nov. 28, 2006.
Interview Summary from U.S. Appl. No. 12/392,392 dated Feb. 3, 2011.
Interview Summary from U.S. Appl. No. 12/702,457 dated Feb. 26, 2014.
Interview Summary from U.S. Appl. No. 12/702,457 dated Jul. 31, 2014.
Interview Summary from U.S. Appl. No. 12/702,457 dated Mar. 4, 2015.

(56) References Cited

OTHER PUBLICATIONS

Interview Summary from U.S. Appl. No. 12/727,459 dated Apr. 13, 2012.
Interview Summary from U.S. Appl. No. 12/727,459 dated Dec. 28, 2011.
Interview Summary from U.S. Appl. No. 13/039,726 dated Oct. 28, 2014.
Notice of Allowance from U.S. Appl. No. 13/039,726 dated Jan. 22, 2015.
Interview Summary from U.S. Appl. No. 12/727,459 dated Aug. 19, 2014.
Notice of Allowance from U.S. Appl. No. 09/515,928 dated Sep. 27, 2010.
Notice of Allowance from U.S. Appl. No. 12/702,457 dated May 26, 2015.
Notice of Allowance from U.S. Appl. No. 12/717,519 dated Apr. 2, 2015.
Notice of Panel Decision from Pre-Appeal Brief Review from U.S. Appl. No. 09/515,928 dated Feb. 8, 2008.
Office action from Chinese application No. 200680028893.4 dated Apr. 24, 2009.
Office action from Japanese Application No. 2008-525265 dated Dec. 12, 2011.
Office action from U.S. Appl. No. 09/515,928 dated Jan. 2, 2002.
Office action from U.S. Appl. No. 09/515,928 dated Mar. 15, 2001.
Office action from U.S. Appl. No. 09/515,928 dated Apr. 20, 2007.
Office action from U.S. Appl. No. 09/515,928 dated Apr. 25, 2006.
Office action from U.S. Appl. No. 09/515,928 dated Sep. 16, 2004.
Office action from U.S. Appl. No. 09/515,928 dated Sep. 19, 2007.
Office action from U.S. Appl. No. 09/515,928 dated Oct. 11, 2001.
Office action from U.S. Appl. No. 09/515,928 dated Oct. 11, 2006.
Office action from U.S. Appl. No. 09/515,928 dated Dec. 2, 2005.
Office action from U.S. Appl. No. 12/119,937 dated Apr. 3, 2012.
Office action from U.S. Appl. No. 12/119,937 dated Apr. 14, 2010.
Office action from U.S. Appl. No. 12/119,937 dated Nov. 4, 2010.
Office action from U.S. Appl. No. 12/392,392 dated Mar. 4, 2010.
Office action from U.S. Appl. No. 12/392,392 dated Jun. 14, 2012.
Office action from U.S. Appl. No. 12/392,392 dated Jul. 19, 2012.
Office action from U.S. Appl. No. 12/392,392 dated Aug. 18, 2011.
Office action from U.S. Appl. No. 12/392,392 dated Sep. 13, 2010.
Office action from U.S. Appl. No. 12/392,392 dated Nov. 21, 2011.
Office Action from U.S. Appl. No. 15/700,455 dated Jan. 29, 2020.
Office Action from U.S. Appl. No. 15/700,455 dated May 7, 2020.
Office action from U.S. Appl. No. 12/392,392 dated Dec. 22, 2010.
Office action from U.S. Appl. No. 12/702,457 dated May 7, 2014.
Office action from U.S. Appl. No. 12/702,457 dated Jun. 18, 2012.
Office action from U.S. Appl. No. 12/702,457 dated Jul. 20, 2012.
Office action from U.S. Appl. No. 12/702,457 dated Nov. 21, 2013.
Office action from U.S. Appl. No. 12/702,457 dated Dec. 3, 2014.
Office action from U.S. Appl. No. 12/717,519 dated May 1, 2012.
Office action from U.S. Appl. No. 12/717,519 dated Jun. 12, 2014.
Office action from U.S. Appl. No. 12/717,519 dated Oct. 3, 2011.
Office action from U.S. Appl. No. 12/717,519 dated Dec. 12, 2014.
Office action from U.S. Appl. No. 12/727,459 dated Jan. 26, 2015.
Office action from U.S. Appl. No. 12/727,459 dated Jan. 10, 2014.
Office action from U.S. Appl. No. 12/727,459 dated Jan. 19, 2012.
Office action from U.S. Appl. No. 12/727,459 dated May 25, 2011.
Office action from U.S. Appl. No. 12/727,459 dated May 30, 2012.
Office action from U.S. Appl. No. 12/727,459 dated Jun. 6, 2014.
Office action from U.S. Appl. No. 12/727,459 dated Jul. 11, 2013.
Office action from U.S. Appl. No. 12/727,459 dated Aug. 30, 2011.
Office action from U.S. Appl. No. 12/727,459 dated Oct. 3, 2012.
Office action U.S. Appl. No. 12/727,459 dated Jan. 26, 2015.
Office action from U.S. Appl. No. 12/727,470 dated Aug. 10, 2012.
Office action from U.S. Appl. No. 12/727,470 dated Apr. 10, 2013.
Office action from U.S. Appl. No. 12/727,470 dated May 26, 2015.
Office action from U.S. Appl. No. 12/727,470 dated Feb. 11, 2016.
Notice of Allowance from U.S. Appl. No. 12/727,470 dated Oct. 7, 2016.
Correct Notice of Allowance from U.S. Appl. No. 12/727,470 dated Oct. 28, 2016.
Corrected Allowability from U.S. Appl. No. 12/727,470 dated Jan. 20, 2017.
Office action from U.S. Appl. No. 12/831,130 dated Feb. 29, 2012.
Office action from U.S. Appl. No. 12/831,130 dated Jun. 14, 2012.
Office action from U.S. Appl. No. 12/831,130 dated Aug. 9, 2012.
Office action from U.S. Appl. No. 13/019,028 dated Jun. 21, 2012.
Office action from U.S. Appl. No. 13/019,028 dated Aug. 10, 2011.
Office action from U.S. Appl. No. 13/019,028 dated Dec. 19, 2012.
Office action from U.S. Appl. No. 13/039,726 dated Feb. 5, 2014.
Office action from U.S. Appl. No. 13/039,726 dated Aug. 14, 2014.
Office action from U.S. Appl. No. 13/193,864 dated Nov. 4, 2013.
Office action from U.S. Appl. No. 13/193,864 dated May 15, 2013.
Office action from U.S. Appl. No. 13/344,025 dated Feb. 26, 2015.
Office action from U.S. Appl. No. 13/344,025 dated Feb. 5, 2013.
Office action from U.S. Appl. No. 13/344,025 dated Mar. 27, 2014.
Office action from U.S. Appl. No. 13/344,025 dated Aug. 16, 2013.
Office action from U.S. Appl. No. 13/344,025 dated Sep. 24, 2014.
Interview Summary from U.S. Appl. No. 13/344,025 dated Jul. 30, 2014.
Interview Summary from U.S. Appl. No. 13/344,025 dated May 21, 2015.
Notice of Allowance from U.S. Appl. No. 13/344,025 dated Nov. 6, 2015.
Supplemental Allowance from U.S. Appl. No. 13/344,025 dated Nov. 23, 2015.
Office action from U.S. Appl. No. 14/188,957 dated Dec. 15, 2016.
Notice of Allowance from U.S. Appl. No. 14/188,957 dated May 4, 2017.
Notice of Allowance from U.S. Appl. No. 14/870,400 dated Oct. 4, 2017.

* cited by examiner

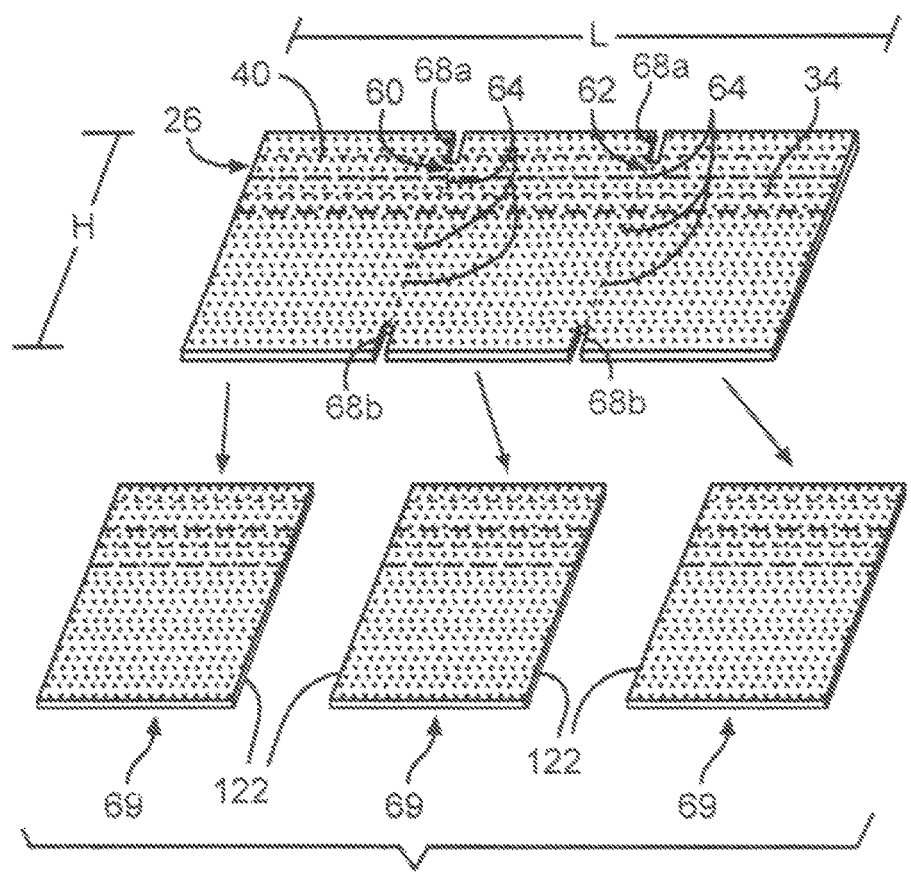
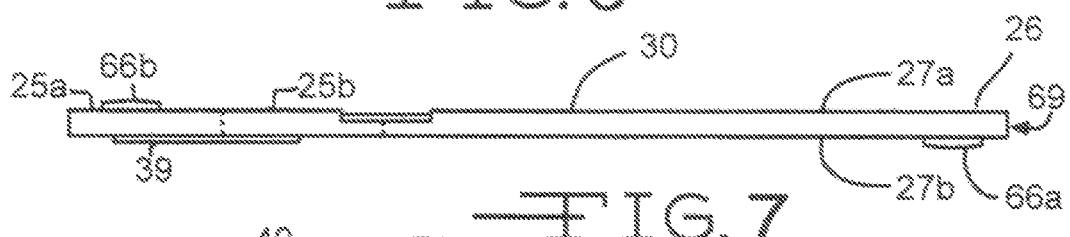
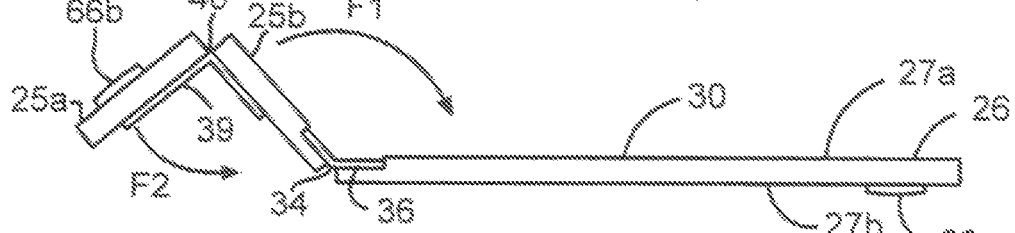
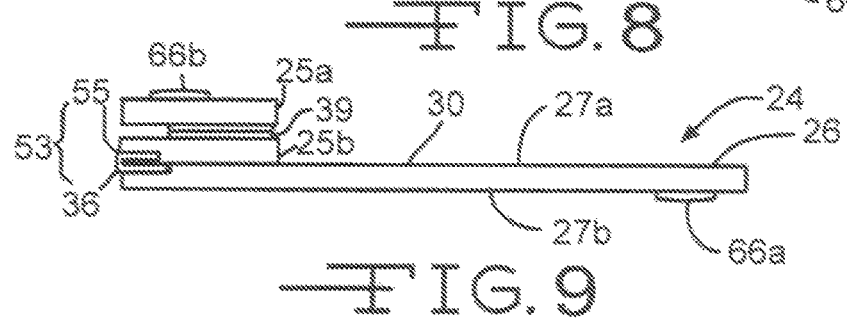

HIP AND RIDGE ROOFING MATERIAL

CROSS REFERENCE TO RELATED APPLICATIONS

The present application is a divisional application of U.S. Ser. No. 14/870,400, filed on Sep. 30, 2015, titled HIP AND RIDGE ROOFING MATERIAL, which is a divisional application of U.S. Ser. No. 12/702,457, filed Feb. 9, 2010, now U.S. Pat. No. 9,151,055, which is a continuation-in-part of U.S. patent application Ser. No. 12/392,392, entitled HIP AND RIDGE ROOFING MATERIAL, filed Feb. 25, 2009, now abandoned, the disclosures of which are incorporated herein by reference in their entirety.

BACKGROUND

Asphalt-based roofing materials, such as roofing shingles, roll roofing and commercial roofing, are installed on the roofs of buildings to provide protection from the elements. The roofing material may be constructed of a substrate such as a glass fiber mat or an organic felt, an asphalt coating on the substrate, and a surface layer of granules embedded in the asphalt coating.

Roofing materials are applied to roofs having various surfaces formed by roofing planes. The various surfaces and roofing planes form intersections, such as for example, hips and ridges. A ridge is the uppermost horizontal intersection of two sloping roof planes. Hips are formed by the intersection of two sloping roof planes running from a ridge to the eaves. It would be desirable to improve the methods used to manufacture hip and ridge roofing material to be more efficient.

SUMMARY

In accordance with embodiments of this invention there are provided shingle blanks. The shingle blanks include a substrate coated with an asphalt coating and including a first fold region, a second fold region, a third region, a lower edge and an upper edge. The shingle blank has a length and the first fold region extends substantially across the length of the shingle blank. The second fold region extends substantially across the length of the shingle blank and is positioned between the first fold region and the third region. A first perforation line is positioned between the second fold region and the third region. A second perforation line is positioned between the first fold region and the second fold region. A reinforcement material is positioned over the first perforation line and is configured to reinforce the first perforation line. The reinforcement material includes a plurality of apertures configured to allow the asphalt coating to bleed through the reinforcement material. The first and second perforation lines are sufficient to facilitate folding of the first fold region and the second fold region on top of the third region to form a three layered stack configured to be applied across a ridge or hip.

In accordance with other embodiments, there are also provided shingle blank having a substrate coated with an asphalt coating and including a first fold region, a second fold region, a third region, a lower edge and an upper edge. The shingle blank has a length and the first fold region extends substantially across the length of the shingle blank. The second fold region extends substantially across the length of the shingle blank and is positioned between the first fold region and the third region. A first perforation line is positioned between the second fold region and the third region. A second perforation line is positioned between the first fold region and the second fold region. A release tape is positioned over the second perforation line and configured to span a portion of the first fold region and the second fold region. The release tape is configured to reinforce the second perforation line. The first and second perforation lines are sufficient to facilitate folding of the first fold region and the second fold region on top of the third region to form a three layered stack configured to be applied across a ridge or hip.

In accordance with other embodiments, there are also provided methods of manufacturing an asphalt-based shingle blank including the steps of coating a substrate with an asphalt coating to form an asphalt coated sheet, the asphalt coated sheet including a first fold region, a second fold region, a third region, a lower edge and an upper edge, the shingle blank having a length, the first fold region extending substantially across the length of the shingle blank, the second fold region extending substantially across the length of the shingle blank and positioned between the first fold region and the third region, applying a reinforcement material to a portion of an upper surface of the asphalt coated sheet and over the first perforation line, the reinforcement material including a plurality of apertures configured to allow the asphalt coating to bleed through the reinforcement material, applying a surface layer of granules to the upper surface of the asphalt coated sheet, forming a first perforation line between the second fold region and the third region and forming a second perforation line between the first fold region and the second fold region.

In accordance with other embodiments, there are also provided methods of installing an asphalt-based roofing material including the steps of providing an asphalt-based shingle blank having a substrate coated with an asphalt coating and including a first fold region, a second fold region, a third region, a lower edge and an upper edge, the shingle blank having a length, the first fold region extending substantially across the length of the shingle blank, the second fold region extending substantially across the length of the shingle blank and positioned between the first fold region and the third region, a first perforation line positioned between the second fold region and the third region, a second perforation line positioned between the first fold region and the second fold region, wherein at least one additional perforation line extends across the shingle blank in a direction substantially perpendicular to the lower edge of the shingle blank, a reinforcement material positioned over the first perforation line and configured to reinforce the first perforation line, the reinforcement material including a plurality of apertures configured to allow the asphalt coating to bleed through the reinforcement material, separating the shingle blank along the at least one additional perforation line to form separated shingle blanks, folding the separated shingle blanks along the first and second perforation lines to form a three layered stack and installing the hip and ridge shingles across a hip or ridge.

Various advantages of this invention will become apparent to those skilled in the art from the following detailed description of the invention, when read in light of the accompanying drawings.

BRIEF DESCRIPTION OF THE DRAWINGS

FIG. 6 is a perspective view of the shingle blank of FIG. 3 illustrating the formation of the individual hip and ridge roofing material of FIG. 2.

FIG. 7 is a side view in elevation of the individual hip and ridge roofing material of FIG. 6 prior to forming the hip and ridge roofing material of FIG. 2.

FIG. 8 is a side view in elevation of an individual hip and ridge roofing material of FIG. 6 illustrating the folds forming the hip and ridge roofing material of FIG. 2.

FIG. 9 is a side view in elevation of an individual hip and ridge material of FIG. 2.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, a hip and ridge shingle, and methods to manufacture the hip and ridge shingle, are provided. It will be understood the term "ridge" refers to the intersection of the uppermost sloping roof planes. The term "roof plane" is defined to mean a plane defined by a flat portion of the roof formed by an area of roof deck. The term "hip" is defined to mean the intersection of sloping roof planes located below the ridge. It will be understood the term "slope" is defined to mean the degree of incline of a roof plane. The term "granule" is defined to mean particles that are applied to a shingle that is installed on a roof.

Figure 1:
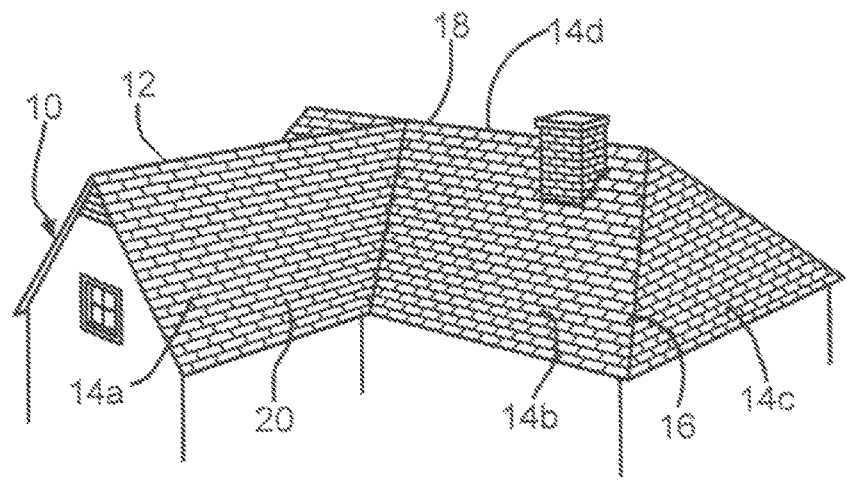
FIG. 1 is a perspective view of a building structure incorporating the hip and ridge roofing material in accordance with embodiments of this invention.

The description and figures disclose a hip and ridge roofing material for a roofing system and methods of manufacturing the hip and ridge roofing material. Referring now to FIG. 1, a building structure 10 is shown having a shingle-based roofing system 12. While the building structure 10 illustrated in FIG. 1 is a residential home, it should be understood that the building structure 10 can be any type of structure, such as a garage, church, arena, industrial or commercial building, having a shingle-based roofing system 12.

The building structure 10 has a plurality of roof planes 14a-14d. Each of the roof planes 14a-14d can have a slope. While the roof planes 14a-14d shown in FIG. 1 have their respective illustrated slopes, it should be understood that the roof planes 14a-14d can have any suitable slope. The intersection of the roof planes 14b and 14c form a hip 16. Similarly, the intersection of the roof planes 14b and 14d form a ridge 18. The building structure 10 is covered by the roofing system 12 having a plurality of shingles 20.

Figure 2:
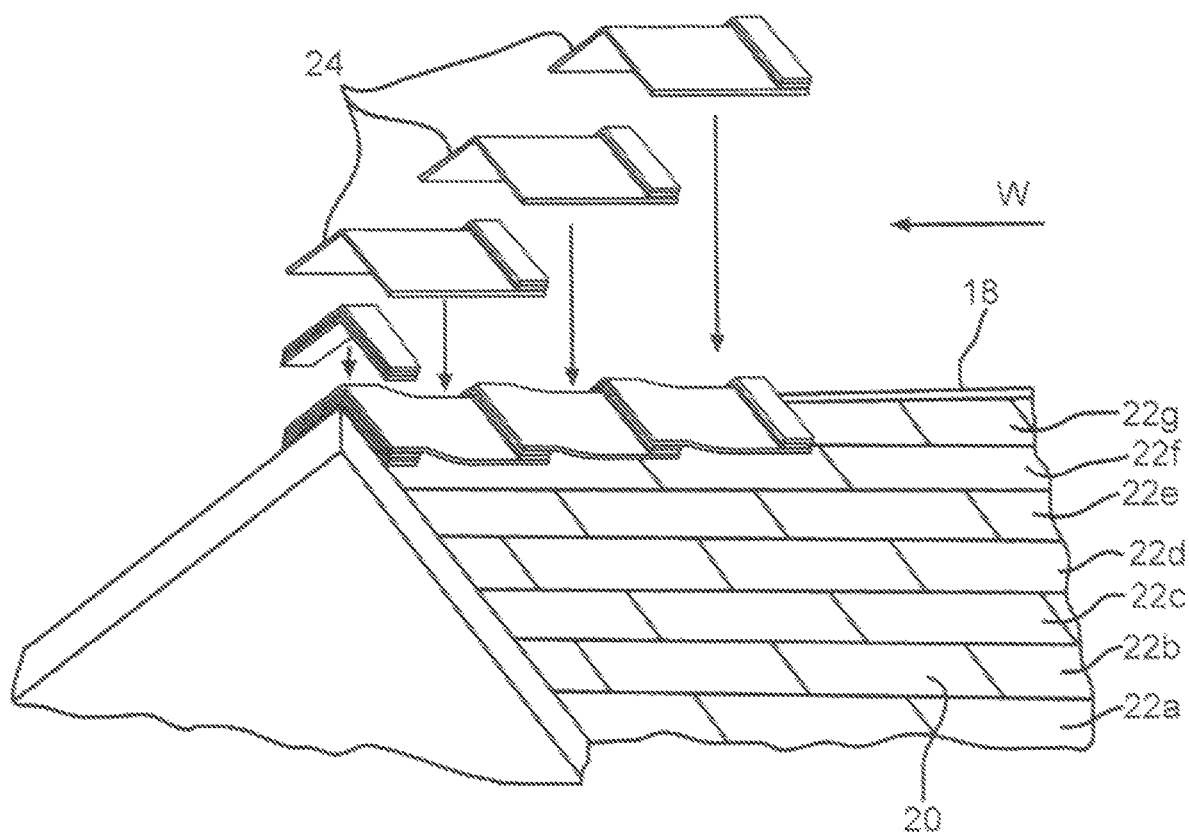
FIG. 2 is a perspective view of the installation of the ridge roofing material of FIG. 1.

Referring now to FIG. 2, the shingles 20 are installed on the various roof decks in generally horizontal courses 22a-22g in which the shingles 20 overlap the shingles 20 of a preceding course. The shingles 20 shown in FIGS. 1 and 2 can be any suitable shingle.

Hip and ridge roofing materials are installed to protect hips and ridges from the elements. As shown in FIG. 2, hip and ridge roofing materials 24 are installed in an overlapping manner on the ridge 18 and over the shingles 20. In a similar fashion, hip roofing materials (not shown) are installed on a hip and over the shingles. The method of installing the hip and ridge roofing materials 24 will be discussed in more detail below.

Figure 3:
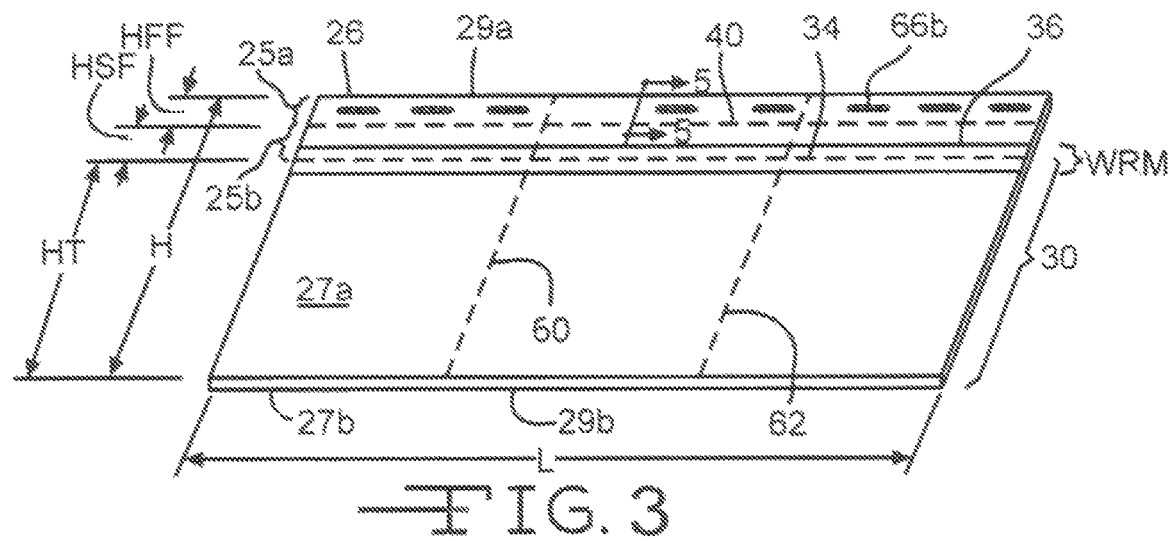
FIG. 3 is a perspective view of an upper surface of a shingle blank used for making the hip and ridge roofing material of FIG. 2.
Figure 4:
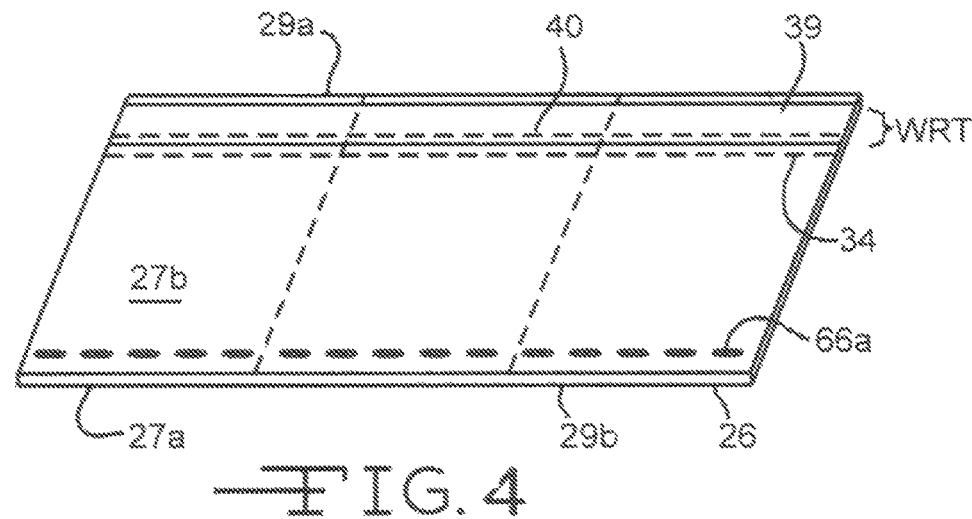
FIG. 4 is a perspective view of a bottom surface of a shingle blank used for making the hip and ridge roofing material of FIG. 2.

Referring now to FIGS. 3 and 4, hip and ridge roofing materials 24 are made from a shingle blank 26. The shingle blank 26 has an upper surface 27a, a lower surface 27b, an upper edge 29a, a lower edge 29b, a generally horizontal first perforation line 34 and a generally horizontal second perforation line 40.

As shown in FIG. 3, a reinforcement material 36 is positioned on the upper surface 27a of the shingle blank 26 and over the first perforation line 34. The reinforcement material 36 is configured for several purposes. First, the reinforcement material 36 is configured to prevent breakage of the shingle blank 26 as the shingle blank 26 is folded about the first perforation line 34. Second, as will be explained in more detail below, the reinforcement material 36 is configured to allow asphaltic material to bleed through the reinforcement material 36, thereby providing a surface for subsequently applied one or more layers of granules to adhere to. In the illustrated embodiment, the reinforcement material 36 is a tape made from a polymeric film material, such as for example polyester. In other embodiments, the reinforcement material 36 can be made from other desired materials, such as the non-limiting examples of a low permeability mat or scrim made from fibrous materials or netting. In the illustrated embodiment, the reinforcement material 36 extends substantially across the length L of the shingle blank 26. The term "substantially" as used herein, is defined to mean any desired distance in a range of from between approximately one-half of the length L to the full length L.

Figure 11:
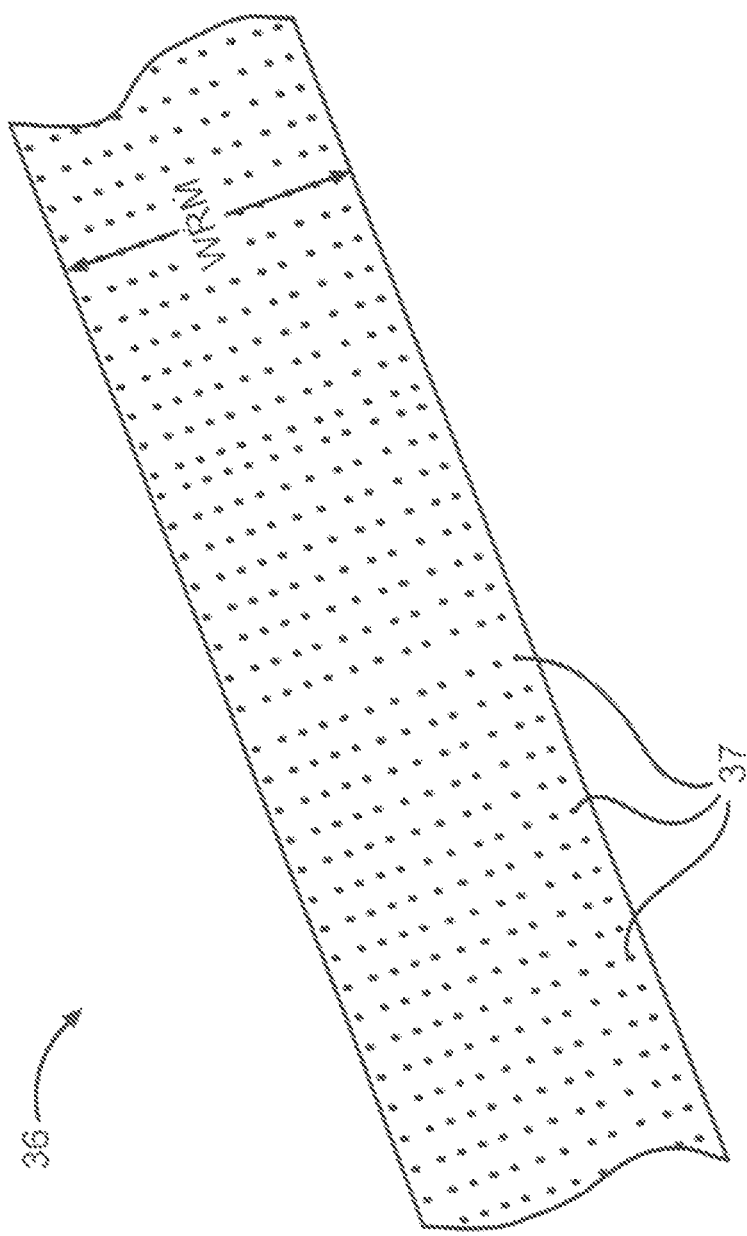
FIG. 11 is a plan view of a reinforcement material used in the hip and ridge roofing material of FIG. 2.

Referring now to FIG. 11, the reinforcement material 36 is illustrated. The reinforcement material 36 has a width WRM and a thickness. In the illustrated embodiment, the width WRM of the reinforcement material 36 is in a range of from about 1.0 inches to about 2.0 inches and the thickness is in a range of from about 50 gauge to about 96 gauge. In other embodiments, the width WRM of the reinforcement material 36 can be less than about 1.0 inches or more than about 2.0 inches and the thickness can be less than about 50 gauge or more than about 96 gauge.

As shown in FIG. 11, the reinforcement material 36 includes a plurality of apertures 37. The apertures 37 are configured to allow asphaltic material to bleed through the reinforcement material 36. In the illustrated embodiment, the apertures 37 are arranged in a pattern of columns and rows are present in concentrations of approximately 330 per square inch. Alternatively, the apertures 37 can be arranged randomly or in other patterns and can have concentrations of less than 330 per square inch or more than 330 per square inch. In the illustrated embodiment, the apertures 37 have a circular shape with diameter in a range of from about 300 microns to about 500 microns. Alternatively, the apertures 37 can have a diameter less than about 300 microns or more than about 500 microns. In still other embodiments, the apertures 37 can have other desired shapes, including the non-limiting examples of square, and polygonal shapes as well as slits.

Referring again to FIG. 3, the shingle blank 26 may have any desired dimensions. For example, a typical residential roofing shingle blank 26 has a length L of approximately 36 inches (91.5 cm) and a height H of approximately 12 inches (30.5 cm) high. However, it will be understood than other desired dimensions may be used.

As shown in FIG. 3, the shingle blank 26 includes a first fold region 25a, a second fold region 25b and a third region 30. The first fold region 25a is the area between the second perforation line 40 and the upper edge 29a. The first fold region 25a is configured to provide a nailing surface for the installation of the ridge or hip roofing material 24 and further configured to provide an optional sealant area. The optional sealant bonding area will be discussed in more detail below. The second fold region 25b is the area between the second perforation line 40 and the first perforation line 34. The first fold region 25a has a height HFF, the second fold region 25b has a height HSF and the third region 30 has a height HT. In the illustrated embodiment, the height HFF is approximately 2.0 inches, the height HSF is approximately 2.0 inches and the height HT is approximately 8.0 inches. In other embodiments the heights HFF, HSF and HT can be other desired dimensions, and it will be understood that the heights HFF, HSF, and HT are largely a matter of design choice.

Referring again to FIG. 3, the first fold region 25a, second fold region 25b and third region 30 extend substantially across the length L of the shingle blank 26.

As further shown in FIG. 3, the shingle blank 26 includes a third and fourth perforation line, 60 and 62. As will be discussed in more detail below, the third and fourth perforation lines, 60 and 62, are configured to allow separation of the shingle blank 26 into three pieces, thereby forming ridge or hip roofing materials 24.

Referring again to FIG. 3, optionally the shingle blank 26 can include a sealant line 66b. The sealant line 66b is configured to provide an adhesive seal for subsequent overlapping ridge roofing materials 24. The sealant line 66b can be any suitable adhesive and can be applied in any form or configuration in any location. In one embodiment, the sealant line 66b can be a continuous strip, not shown or continuous strips, not shown, having a constant width. Alternatively, the sealant line 66b can be a discontinuous strip or strips having varying widths. One example of a sealant line is the sealant line of the type disclosed in U.S. Pat. No. 4,738,884 to Algrim et al., the disclosure of which is incorporated herein in its entirety.

Referring now to FIG. 4, the lower surface 27b of the shingle blank 26 includes a release tape 39 and an optional sealant line 66a. The release tape 39 is positioned on the lower surface 27b of the shingle blank 26 in a location suitable to cover the optional sealant line 66b and also to cover the second perforation line 40. The release tape 39 is configured for several purposes. First, the release tape 39 is configured to cover the optional sealant line 66b as shingle blanks 26 are stacked for storage or shipping. Second, the release tape 39 is configured to prevent breakage of the shingle blank 26 as the shingle blank 26 is folded about the second perforation line 40. In the illustrated embodiment, the release tape 39 is made of a polymeric film material having a thickness in a range of about 30 gauge to about 96 gauge. In other embodiments, the release tape 39 can be made of other desired materials or combinations of materials and can have thicknesses less than about 30 gauge or more than about 96 gauge.

Referring again to FIG. 4, the optional sealant line 66a is configured to provide an adhesive seal for subsequent overlapping ridge roofing materials 24. In the illustrated embodiment, the sealant line 66a is the same as the optional sealant line 66b illustrated in FIG. 3 and discussed above. Alternatively, the sealant line 66a can be different from the sealant line 66b. In some embodiments, when the shingle blanks 26 are stacked for storage and shipping, the shingle blanks 26 are flipped such that the release tape 39 of one shingle blanks substantially aligns with the sealant line 66a of a subsequently stacked shingle blank. This alignment allows for easy separation of the stacked shingle blanks 26 at an installation site.

Referring again to the embodiment illustrated in FIG. 4, the release tape has a width WRT in a range of from about 3.00 inches to about 4.00 inches. However, in other embodiments, the width WRT of the release tape can be less than about 3.00 inches or more than about 4.00 inches. In still other embodiments, the release tape 39 can have any desired coatings.

Figure 5:
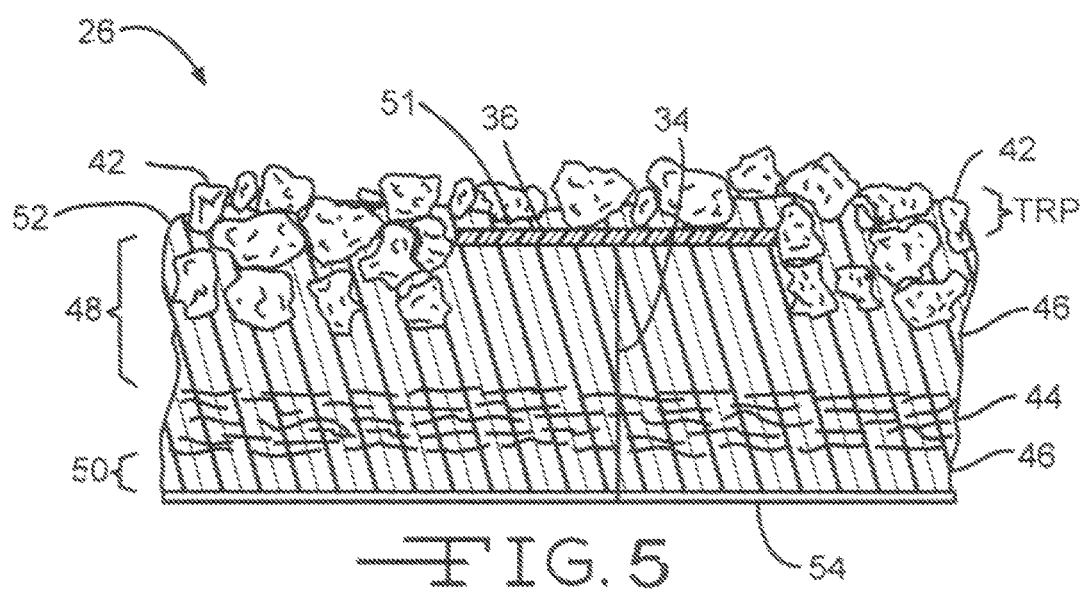
FIG. 5 is an enlarged cross-sectional view, taken along the line 5-5 of FIG. 3, of a portion of the hip and ridge roofing material of FIG. 3.

Referring now to FIG. 5, one embodiment of the composition of the shingle blank 26 is illustrated. The shingle blank 26 includes a substrate 44 that is coated with an asphalt coating 46. The substrate 44 can be any suitable substrate for use in reinforcing asphalt-based roofing materials, including, but not limited to a nonwoven web, scrim or felt of fibrous materials such as glass fibers, mineral fibers, cellulose fibers, rag fibers, mixtures of mineral and synthetic fibers, or the like. Combinations of materials can also be used in the substrate 44.

The asphalt coating 46 includes an upper section 48 that is positioned above the substrate 44 when the roofing material is installed on a roof, and a lower section 50 that is positioned below the substrate 44. The upper section 48 includes an upper surface 52. The team "asphalt coating" means any type of bituminous material suitable for use on a roofing material, including, but not limited to asphalts, tars, pitches, or mixtures thereof. The asphalt can be either manufactured asphalt produced by refining petroleum or naturally occurring asphalt. The asphalt coating 46 can include various additives and/or modifiers, such as inorganic fillers or mineral stabilizers, organic materials such as polymers, recycled streams, or ground tire rubber.

The reinforcement material 36 is positioned on the upper surface 52 of the upper section 48 such that portions of the asphalt coating 46 bleed through the apertures (not shown) within the reinforcement material 36. The portion of the asphalt coating 46 that has bled through the reinforcement material 36 forms a reinforced portion 51 of the upper section 48. The reinforced portion 51 of the upper section 48 has a thickness TRP. In the illustrated embodiment, the thickness of the reinforced portion 51 is in a range of from about 0.05 inches to about 0.30 inches. In other embodiments, the thickness TRP of the reinforced portion 51 can be less than about 0.05 inches or more than about 0.30 inches.

A layer of granules 42 is pressed into the upper surface 52 and the reinforced portion 51 of the upper section 48. The granules 42 can be any desired granules or combination of granules. Some examples of granules include prime, headlap granules or waste granules. Optionally, the lower section 50 can be coated with a suitable backdust material 54.

Referring now to FIG. 6, the shingle blank 26 includes the third perforation line 60 and the fourth perforation line 62. The third and fourth perforation lines, 60 and 62, include perforations 64. The third and fourth perforation lines, 60 and 62, are spaced apart substantially perpendicular to the lower edge 29b of the shingle blank 26 and span the height H of the shingle blank 26. The third and fourth perforation lines, 60 and 62, are positioned such that subsequent separation of the shingle blank 26 along the third and fourth perforation lines, 60 and 62, forms hip and ridge shingle blanks 69. In the illustrated embodiment, the formed hip and ridge shingle blanks 69 has a length of approximately 12.0 inches. In other embodiments, the third and fourth perforation lines, 60 and 62, can be positioned relative to each other, to result in formed hip and ridge shingle blanks 69 having lengths of more or less than approximately 12.0 inches. In still other embodiments, the shingle blank 26 can have more than two perforation lines (not shown), spaced apart substantially perpendicular to the lower edge 29b of the shingle blank 26 and spanning the height H of the shingle blank 26. The additional perforation lines can be configured to separate the shingle blank 26 thereby forming hip and ridge shingle blanks of any desired sizes.

In the illustrated embodiment, the perforations 64 extend through the upper section 48 of the asphalt coating 46, the substrate 44 and the lower section 50 of the asphalt coating 46. In other embodiments, the perforations 64 can extend through any suitable layers of the shingle blank 26. The perforations 64 can be arranged in any suitable pattern to form the third and fourth perforation lines, 60 and 62.

In one example of a perforation pattern, the perforations 64 can be about 0.25 inches long and spaced apart from edge to edge by about 0.25 inches. In another embodiment of a perforation pattern, the perforations 64 can be about 0.50 inches long and spaced apart from edge to edge about 0.50 inches. Alternatively, the perforations 64 can be any suitable length and can be spaced apart edge to edge by any suitable length. The perforations 64 are configured such that an installer is able to separate the shingle blanks 26 into the hip and ridge shingle blanks 69 at the installation site. In the illustrated embodiment, the third and fourth perforation lines, 60 and 62, extend the full height H of the shingle blank 26. Alternatively, the third and fourth perforation lines, 60 and 62, can extend any length sufficient to enable an installer to separate the shingle blanks 26 into the ridge shingle blanks 69 at an installation site.

Referring again to FIG. 6, optionally a plurality of headlap courtesy cuts 68a are positioned in the first fold region 25a and a plurality of prime courtesy cuts 68b are positioned in the third region 30 of the shingle blank 26. In the illustrated embodiment, the headlap courtesy cuts 68a are configured to substantially align with a corresponding prime courtesy cut 68b, and the aligned headlap and prime courtesy cuts, 68a and 68b, are further aligned along the perforation lines, 60 and 62. As shown in the illustrated embodiment, the headlap courtesy cuts 68a and the prime courtesy cuts 68b extend substantially through the thickness of the shingle blank 26. In other embodiments, the courtesy cuts, 68a and 68b, can extend through any suitable layers of the shingle blank 26. The headlap and prime courtesy cuts, 68a and 68b, have a length. In the illustrated embodiment, the length of the headlap and prime courtesy cuts, 68a and 68b, is in a range of from about 1.0 inches to about 5.0 inches. In other embodiments, the length of the headlap and prime courtesy cuts, 68a and 68b, can be less than about 1.0 inches or more than about 5.0 inches. While the illustrated embodiment shows the headlap courtesy cuts 68a and the prime courtesy cuts 68b as being the same length, it should be understood that headlap courtesy cuts 68a and the prime courtesy cuts 68b can be different lengths. The courtesy cuts, 68a and 68b, are configured to assist the installer in separating the shingle blanks 26. As will be explained below in more detail, the courtesy cuts, 68a and 68b, are provided in the shingle blank 26 during the manufacture of the shingle blank 26.

Referring again to FIG. 6, the shingle blanks 26 arrive at the installation site having third and fourth perforation lines 60 and 62. During installation, the roofing installer separates the shingle blank 26 along the third and fourth perforation lines, 60 and 62 to form the hip and ridge shingle blanks 69. The perforations 64 allow for hip and ridge shingle blanks 69 to be formed from the shingle blanks 26 as the perforations 64 allow the substrate 44 and asphalt regions, 48 and 50, to be readily separated. The hip and ridge shingle blanks 69 have perforated edges 122. The configuration of the perforations 64 result in a perforated edge 122 which in some embodiments is somewhat ragged. As one example, if the individual perforations 64 have a relatively long length or if a larger quantity of perforations 64 are used, then the perforation edges 122 are somewhat smoother. Conversely, if the individual perforations 64 have a relatively short length or if a fewer number of perforations 64 are used, then the perforation edges 122 are somewhat more ragged.

Referring now to FIGS. 7-9, the hip and ridge shingle blanks 69 are formed into the ridge roofing materials 24 by a series of folds. First, as shown in FIG. 7, the hip and ridge shingle blank 69 is positioned such that the upper surface 27a is facing upward and the lower surface 27b is facing downward. Next, as shown in FIG. 8, the second fold region 25b is folded about the first perforation line 34 in direction F1 at the same time the first fold region 25a is folded about the second perforation line 40 in direction F2. As shown in FIG. 9, the folds result in a three-layered stack 53 that includes the first fold region 25a, the second fold region 25b and the third region 30. The three-layered stack 53 has a leading edge 55. The optional sealant line 66b is shown on the first fold region 25a and the optional sealant line 66a is shown on the lower surface 27b. Folding the hip and ridge single blanks 69 and forming the three layered stack 53 forms the ridge roofing materials 24. As shown in FIG. 9, the resulting three layered stack 53 has substantially aligned edges. Optionally, the resulting three layered stack can have offset edges.

Referring again to FIG. 2, the hip and ridge roofing materials 24 are installed in an overlapping manner on the ridge 18 and over the shingles 20. As a first installation step, a three-layered stack 53 is cut from a hip and ridge roofing material 24 and fastened to the farthest downwind point on the ridge 18. As shown in FIG. 2, the direction of the wind in indicated by the arrow marked W. The three-layered stack 53 can be fastened by any desired fastening method, such as for example, roofing nails (not shown). Next, a hip and ridge roofing material 24 is installed over the three-layered stack 53 such that a portion of the hip and ridge roofing material 24 overlaps the three-layered stack 53 and the leading edge 55 of the three-layered stack 53 is facing the wind direction W. The hip and ridge roofing material 24 is fastened to the ridge 18 in any desired manner. Additional hip and ridge roofing materials 24 are installed in a similar fashion until the ridge 18 is covered.

While the hip and ridge roofing material 24 illustrated in FIGS. 2 and 9 illustrates a three layered stack 53, it should be appreciated that the hip and ridge roofing material 24 can be practiced with a stack formed by more than three layers. The hip and ridge roofing material 24 having a stack of more than three layers would have a corresponding number of fold regions and would be formed by folding the various fold regions to form the stack.

Figure 10:
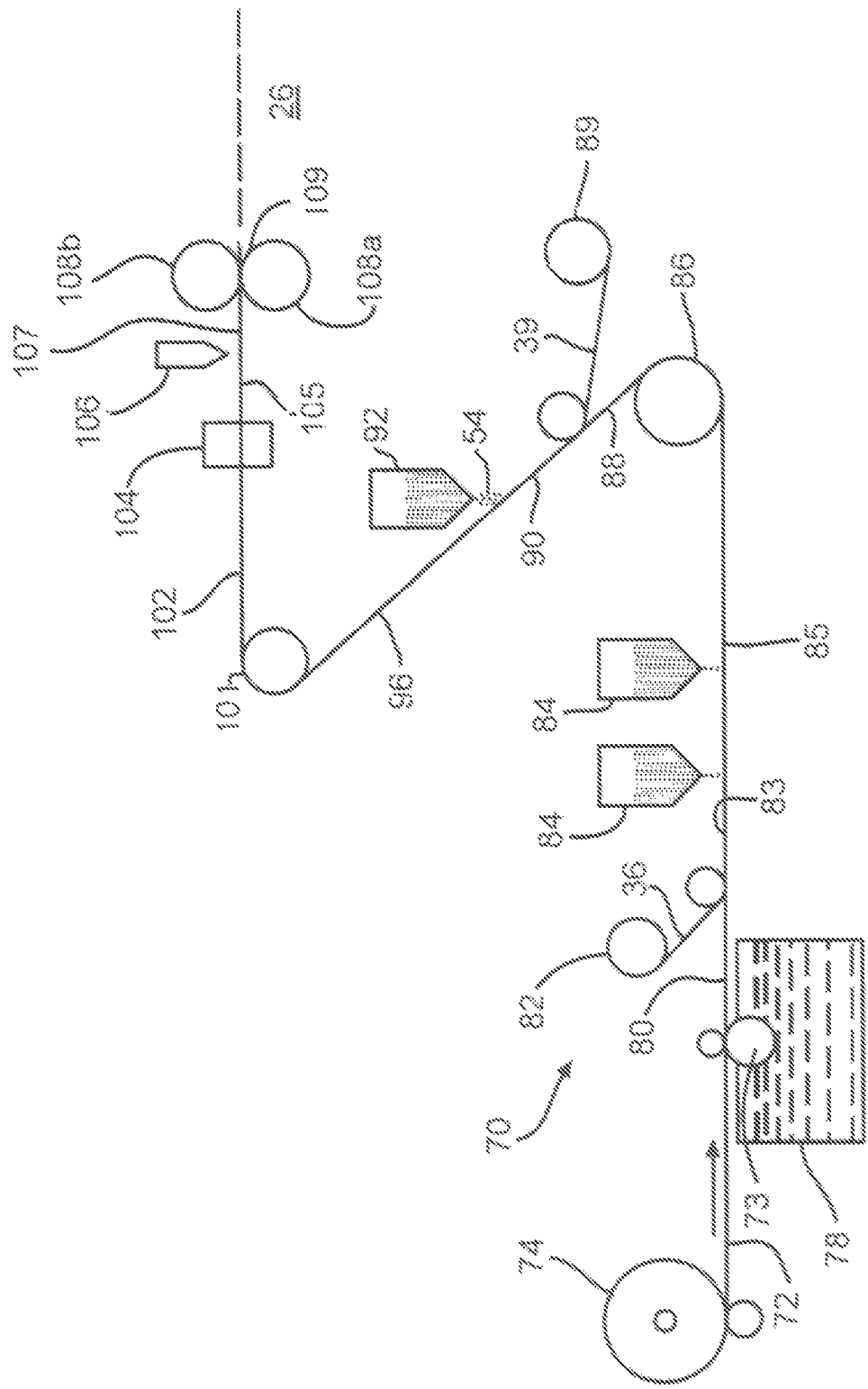
FIG. 10 is a schematic view in elevation of apparatus for manufacturing the hip and ridge roofing material of FIG. 2.

Referring now to FIG. 10, an apparatus 70 for manufacturing shingle blanks 26 is illustrated. The manufacturing process involves passing a continuous sheet 72 in a machine direction (indicated by the arrow) through a series of manufacturing operations. The sheet 72 usually moves at a speed of at least about 200 feet/minute (61 meters/minute), and typically at a speed within the range of between about 450 feet/minute (137 meters/minute) and about 800 feet/minute (244 meters/minute). The sheet 72, however, may move at any desired speed.

In a first step of the illustrated manufacturing process, a continuous sheet of substrate or shingle mat 72 is payed out from a roll 74. The substrate can be any type known for use in reinforcing asphalt-based roofing materials, such as a non-woven web of glass fibers. The shingle mat 72 may be fed through a coater 78 where an asphalt coating is applied to the shingle mat 72. The asphalt coating can be applied in any suitable manner. In the illustrated embodiment, the shingle mat 72 contacts a roller 73, that is in contact with a supply of hot, melted asphalt. The roller 73 completely covers the shingle mat 72 with a tacky coating of hot, melted asphalt to define a first asphalt coated sheet 80. In other embodiments, however, the asphalt coating could be sprayed on, rolled on, or applied to the shingle mat 72 by other means. In some embodiments, the asphalt material is highly filled with a ground stone filler material, amounting to at least about 60 percent by weight of the asphalt/filler combination.

A continuous strip of the reinforcement material 36 is then payed out from a roll 82. The reinforcement material 36 adheres to the upper surface 27a of the first asphalt coated sheet 80 to define a second asphalt coated sheet 83. In one embodiment, the reinforcement material 36 is attached to the first asphalt coated sheet 80 by the adhesive mixture of the asphalt in the first asphalt coated sheet 80. The reinforcement material 36, however, may be attached to the first asphalt coated sheet 80 by any suitable means, such as other adhesives.

As discussed above, the reinforcement material 36 is configured to allow asphaltic material to bleed through the apertures 37 of the reinforcement material 36, thereby forming the reinforced portion 51 of the upper section 48 as illustrated in FIG. 5.

The resulting second asphalt coated sheet 83 is then passed beneath a series of granule dispensers 84 for the application of granules to the upper surface 27a of the second asphalt coated sheet 83. While the illustrated embodiment shows two granule dispensers 84, it should be understood that any number of granule dispensers 84 can be used. The granule dispensers 84 can be of any type suitable for depositing granules onto the second asphalt coated sheet 83. A granule dispenser that can be used is a granule valve of the type disclosed in U.S. Pat. No. 6,610,147 to Aschenbeck. The granule dispensers 84 are configured to provide the desired blend drops of headlap and prime granules. The granule dispensers 84 are supplied with granules from sources of granules, not shown. After all the granules are deposited on the second asphalt coated sheet 83 by the series of granule dispensers 84, the second asphalt covered sheet 83 becomes a granule covered sheet 85.

The granule covered sheet 85 is then turned around a slate drum 86 to press the granules into the asphalt coating and to temporarily invert the granule covered sheet 85 so that the excess granules will fall off and will be recovered and reused. The excess granules falling from the inverted granule covered sheet can be collected in any desired collection device (not shown), including the non-limiting example of a backfall hopper. Turning the granule covered sheet 85 around the slate drum forms inverted sheet 88.

A continuous strip of the release tape 39 is then payed out from a roll 89 and applied to the inverted sheet 88. The release tape 39 adheres to the lower surface 27b of the inverted sheet 88 to define a taped inverted sheet 90. In one embodiment, the release tape 39 is attached to the inverted sheet 88 by the adhesive mixture of the asphalt in the inverted sheet 88. The release tape 39, however, may be attached to the inverted sheet 88 by any suitable means, such as other adhesives.

In one embodiment as shown in FIG. 10, a backdust applicator 92 is positioned to apply a thin layer of backdust material 54 to a bottom surface of the taped inverted sheet 90. The backdust material 54 is configured to adhere to the bottom surface of the taped inverted sheet 90 and results in a substantially less tacky bottom surface for downstream shingle production operations. In one embodiment, the backdust material 54 is sand. Alternatively, the backdust material 54 can be any material, such as for example natural rock dust or small glass particles, sufficient to adhere to the bottom surface of the taped inverted sheet 90 and result in a substantially less tacky bottom surface. Application of the backdust material 54 to the taped inverted sheet 90 forms dusted inverted sheet 96.

Subsequent to the application of the backdust material 54 to the taped inverted sheet 90, the dusted inverted sheet 96 is turned around a sand drum 101 to press the backdust material 54 into the bottom surface of the dusted inverted sheet 96. Pressing the backdust material 56 into the dusted inverted sheet 96 forms pressed sheet 102.

Referring again to FIG. 10, the pressed sheet 102 is cooled by any suitable cooling apparatus 104, or allowed to cool at ambient temperature to form a cooled sheet 105.

The cooled sheet 105 is passed through optional sealant applicator 106. The sealant applicator 106 is configured to apply the optional sealant line 66b to the first fold region 25a of the cooled sheet 105 and apply the optional sealant line 66a to the lower surface 27b of the cooled sheet 105. The sealant applicator 106 can be any suitable mechanism for applying the sealant lines, 66a and 66b, to the cooled sheet 105. In the illustrated embodiment, a single sealant applicator 106 is shown. Alternatively, any number of sealant applicators 106 can be used. Application of the optional sealant lines, 66a and 66b, to the cooled sheet 105 forms sealant lined sheet 107.

The sealant lined sheet 107 is passed through cutting roller 108a and anvil roller 108b. In the illustrated embodiment, the rollers, 108a and 108b, are configured to perform several manufacturing operations. First, the cutting roller 108a and the anvil roller 108b are configured to form the perforation lines, 34, 40, 60 and 62, each having the perforations 64. As discussed above, the perforations 64 can have any desired configuration and the perforation lines, 34, 40, 60 and 62, can be positioned in any desired location. The cutting roller 108a includes a plurality of perforating knives 109 configured to form the perforations 64 as the cutting roller 108a rotates and contacts the sealant lined sheet 107. The cutting roller 108a and the anvil roller 108b are also configured to form the courtesy cuts, 68a and 68b. Last, the cutting roller 108a and the anvil roller 108b are configured to cut the sealant lined sheet 107 to form individual shingle blanks 26.

While FIG. 10 illustrates one example of an apparatus 70 configured for forming the perforations 64, the optional courtesy cuts 68a and 68b and cutting the individual shingle blanks 26, it should be understood that other suitable mechanisms or combinations of mechanisms can be used.

The shingle blanks 26 are collected and packaged such that the release tape 39 positioned on the lower surface 27b of the shingle blanks 26 covers the optional sealant line 66b located on the upper surface 27a of a subsequent shingle blank 26. While the embodiment shown in FIG. 10 illustrates the perforating and cutting processes as a single process, it is within the contemplation of this invention that the perforating and cutting processes can be completed at different times and by different apparatus.

While the apparatus is shown and described in terms of a continuous process, it should be understood that the manufacturing method can also be practiced in a batch process using discreet lengths of materials instead of continuous sheets.

The principle and mode of operation of this invention have been described in certain embodiments. However, it should be noted that this invention may be practiced otherwise than as specifically illustrated and described without departing from its scope.

What is claimed is:

1. A roofing material comprising:
a top asphalt-coated layer having an exposed upper surface;
a layer of granules embedded in the exposed upper surface of the top asphalt-coated layer;
a bottom asphalt-coated layer having a first height extending from a first front edge to a first rear edge and a first length extending from a first side edge to a second side edge; and
an intermediate asphalt-coated layer having a second height extending from a second front edge to a second rear edge and a second length extending from a third side edge to a fourth side edge;
wherein the intermediate asphalt-coated layer is disposed between the top asphalt-coated layer and the bottom asphalt-coated layer such that the intermediate asphalt-coated layer is parallel to both of the top and bottom asphalt-coated layers;
wherein the second rear edge of the intermediate asphalt-coated layer is aligned with the first rear edge of the bottom asphalt-coated layer and a third rear edge of the top asphalt coated layer;
wherein the first height of the bottom asphalt-coated layer is greater than the second height of the intermediate asphalt-coated layer;
wherein the top asphalt-coated layer and the bottom asphalt-coated layer are the outermost asphalt-coated layers of the roofing material;
wherein the intermediate asphalt-coated layer extends across more than half of the first length of the bottom asphalt-coated layer;
wherein the second height of the intermediate asphalt-coated layer is uniform along an entirety of the second length of the intermediate asphalt-coated layer;
wherein an entirety of the third side edge of the intermediate asphalt-coated layer is aligned with the first side edge of the bottom asphalt-coated layer and a fifth side edge of the top asphalt-coated layer; and
wherein an entirety of the fourth side edge of the intermediate asphalt-coated layer is aligned with the second side edge of the bottom asphalt-coated layer and a sixth side edge of the top asphalt-coated layer.

2. The roofing material of claim 1, wherein the top asphalt-coated layer comprises a non-woven web coated with asphalt.

3. The roofing material of claim 1, wherein the top asphalt-coated layer comprises a non-woven web of glass fibers coated with asphalt.

4. The roofing material of claim 1, wherein backdust is embedded in the intermediate asphalt-coated layer.

5. The roofing material of claim 1, wherein backdust is embedded in the bottom asphalt-coated layer.

6. The roofing material of claim 1, wherein the second front edge of the intermediate asphalt-coated layer is a continuous edge.

7. The roofing material of claim 1, wherein the first rear edge of the bottom asphalt-coated layer is a continuous edge, and wherein the second rear edge of the intermediate asphalt-coated layer is a continuous edge.

8. The roofing material of claim 1, wherein the bottom asphalt-coated layer and the intermediate asphalt-coated layer are formed from a single substrate; and
wherein the single substrate comprises a perforation line that is disposed between the bottom asphalt-coated layer and the intermediate asphalt-coated layer such that the intermediate asphalt-coated layer is folded about a perforation line to create the intermediate asphalt-coated layer and the bottom asphalt-coated layer.

9. The roofing material of claim 1, wherein a ratio of the first height of the bottom asphalt-coated layer to the second height of the intermediate asphalt-coated layer is 4 to 1.

10. The roofing material of claim 1, wherein the second height of the intermediate asphalt-coated layer is 2 inches.

11. The roofing material of claim 1, wherein the top asphalt-coated layer has a third height extending from a third front edge to the third rear edge; and
wherein the third height is equal to the second height of the intermediate layer.

12. The roofing material of claim 1, further comprising a release tape attached to the top asphalt-coated layer and the intermediate asphalt-coated layer.

13. The roofing material of claim 12, wherein the release tape is positioned between the top asphalt-coated layer and the intermediate asphalt-coated layer.

14. The roofing material of claim 13, wherein the release tape extends along more than half of the second height of the intermediate asphalt-coated layer.

15. The roofing material of claim 13, wherein the release tape creates a gap between the top asphalt-coated layer and the intermediate asphalt-coated layer.

16. The roofing material of claim 12, wherein the release tape has a width between about 3 inches and about 4 inches.

17. The roofing material of claim 12, wherein the release tape has a thickness between about 30 gauge and about 96 gauge.

18. The roofing material of claim 1, wherein the second front edge of the intermediate asphalt-coated layer is aligned with a third front edge of the top asphalt-coated layer.

19. The roofing material of claim 1, wherein the intermediate asphalt-coated layer extends across an entirety of the first length of the bottom asphalt-coated layer.

20. The roofing material of claim 1, wherein the first length of the bottom asphalt-coated layer defines a total length of the roofing material.

\* \* \* \* \*